(12) United States Patent
Russo et al.

(10) Patent No.: US 7,774,406 B2
(45) Date of Patent: Aug. 10, 2010

(54) METHOD AND SYSTEM FOR AN INDEPENDENT COLLABORATIVE COMPUTING COMMUNITY

(75) Inventors: Joseph A. Russo, Westford, MA (US); Sami M. Shalabi, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 10/744,258

(22) Filed: Dec. 22, 2003

(65) Prior Publication Data

US 2005/0138185 A1  Jun. 23, 2005

(51) Int. Cl.
G06F 15/16 (2006.01)
(52) U.S. Cl. .................... 709/204; 709/205; 709/229
(58) Field of Classification Search ............ 709/229, 709/205, 204
See application file for complete search history.

(56) References Cited

U.S. PATENT DOCUMENTS

| | | | |
|---|---|---|---|
| 6,347,333 B2 * | 2/2002 | Eisendrath et al. | 709/217 |
| 6,505,031 B1 * | 1/2003 | Slider et al. | 434/350 |
| 2001/0034645 A1 * | 10/2001 | Tenembaum | 705/14 |
| 2004/0153509 A1 * | 8/2004 | Alcorn et al. | 709/205 |
| 2005/0086296 A1 * | 4/2005 | Chi et al. | 709/203 |

* cited by examiner

Primary Examiner—John Follansbee
Assistant Examiner—Nghi V Tran
(74) Attorney, Agent, or Firm—Raymond W. Szeto, Esq.; Steven M. Greenberg, Esq.; Carey, Rodriguez, Greenberg & Paul, LLP

(57) ABSTRACT

A method and system for the establishment and maintenance of a collaborative computing community. The community includes one or more community members having membership data corresponding to their membership stored in a database and one or more collaborative components. A membership adapter interface is used to facilitate an exchange of information between the database and the collaborative components. A community template stored in which the community template indicates which collaborative components are accessible by the one or more community members. Such indication can be provided by data in a community role table of roles within the community, a collaborative component table identifying one or more collaborative components and API locations corresponding to the one or more collaborative components and a role map defining a mapping between the community roles in the community role table, named permission sets and the one or more identified collaborative components.

18 Claims, 2 Drawing Sheets

METHOD AND SYSTEM FOR AN INDEPENDENT COLLABORATIVE COMPUTING COMMUNITY

BACKGROUND OF THE INVENTION

1. Statement of the Technical Field

The present invention relates to the field of collaborative computing and more particularly to the establishment and maintenance of collaborative computing communities through the implementation of a collaborative computing community model.

2. Description of the Related Art

Collaborative computing provides a means for users to pool their strengths and experiences to achieve a common goal. For example, a common goal may be an educational objective, the completion of a software development project or even creation and use of a system to manage human resources. The establishment of a collaborative computing environment typically involves the creation or definition of a community. The community provides the framework under which the collaborative computing objective is achieved.

A collaborative computing community is defined by (1) a particular context, i.e. the objective of the community, (2) membership, i.e., the participants in the community, and (3) a set of roles for the community members. Roles are names given to the people in the community which dictate access to the community's resources and tools as well as define the behavior of the community members. Community creators or administrators may desire that the specific roles have specific access and policy attributes for the different business components, i.e. tools, resources, etc. within the community.

The notion of a collaborative computing community exists where a group of users share a common goal in which there is an integration of access rights in application components, access rights to data and interaction among roles within the group. This is the case even where no actual collaborative computing hardware and software system exists. For example, there exists a need to provide an efficient way to add new community members who need access to multiple resources, such as databases, within a computing environment system and to provide an efficient way to implement processes to affect behavioral roles such as causing certain actions to be taken which relate to the new members. This need exists independently of the existence and implementation of a collaborative computing system such as IBM's LOTUS WORKPLACE.

As another example, there may be a need for an administrator to manually configure access within the community to add new community members to all appropriate resources within the community. This process is referred to as provisioning. For example, an administrator adding a new user to a company community instance for Business X may be required to add the user to a business discussion forum database, a 401(k) plan database which includes a forum for discussion and information regarding enrollment, a health plan database, a phone number listing database, set up email, etc. Still other persons may then be responsible for initiating other actions such as ordering business cards, ordering desk supplies, etc. As such, the provisioning process can be very time consuming, expensive and onerous but is needed by users who form a community, regardless of whether an actual collaborative computing system is in place.

As noted above, an aspect of a community is the notion of roles. For example, consider a community relating to a software development system where members of the community are collaborating to develop a software product. Roles may include Development Manager, Architect and Software Developer, each of which has a different set of access permissions with respect to collaborative components, i.e. software application instances such as specific databases, forums, etc. which are used by members of the community. Although the different roles have different permissions, members having the same roles generally have the same access to most business component instances within the community. As noted above, current systems require that an administrator separately provision resources for each user added to the community. As such, even though a new member of the community, such as a new employee, may need access to the same business component instances as a colleague having the same role, administrators must still go through the provisioning process.

It is therefore desirable to have a system and method which solves the above-described problems and which provides access to collaborative components in a manner which is reusable within and between different communities, regardless of the existence of a physical collaborative computing system such as WORKPLACE.

SUMMARY OF THE INVENTION

The present invention addresses the deficiencies of the art in respect to collaborative community modeling and provides a novel and non-obvious method and system for a collaborative computing community that is independent of the existence of a physical collaborative computing system.

Methods consistent with the present invention provide a method for the establishment and maintenance of a collaborative computing community. The collaborative computing community includes one or more collaborative components and one or more community members having membership data corresponding to their membership stored in a database in which a membership adapter interface is used to facilitate an exchange of information between the database and the collaborative components. A community template is stored in which the community template indicates which collaborative components are accessible by the one or more community members.

Systems consistent with the present invention include a system for a collaborative computing community having one or more community members in which the system has at least one collaborative component and a computer. The computer includes a database and a central processing unit. The database stores membership data for the one or more community members and a community template. The community template indicates which of the at least one collaborative components are accessible by the one or more community members. The central processing unit uses a membership adapter interface to exchange information between the database and the collaborative components based on the community template.

According to another aspect, the present invention provides a computer-readable storage medium storing a computer program which when executed performs a method for the establishment and maintenance of a collaborative computing community. The collaborative computing community includes one or more collaborative components and one or more community members having membership data corresponding to their membership stored in a database in which a membership adapter interface is used to facilitate an exchange of information between the database and the collaborative components. A community template is stored in which the community template indicates which collaborative components are accessible by the one or more community members.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
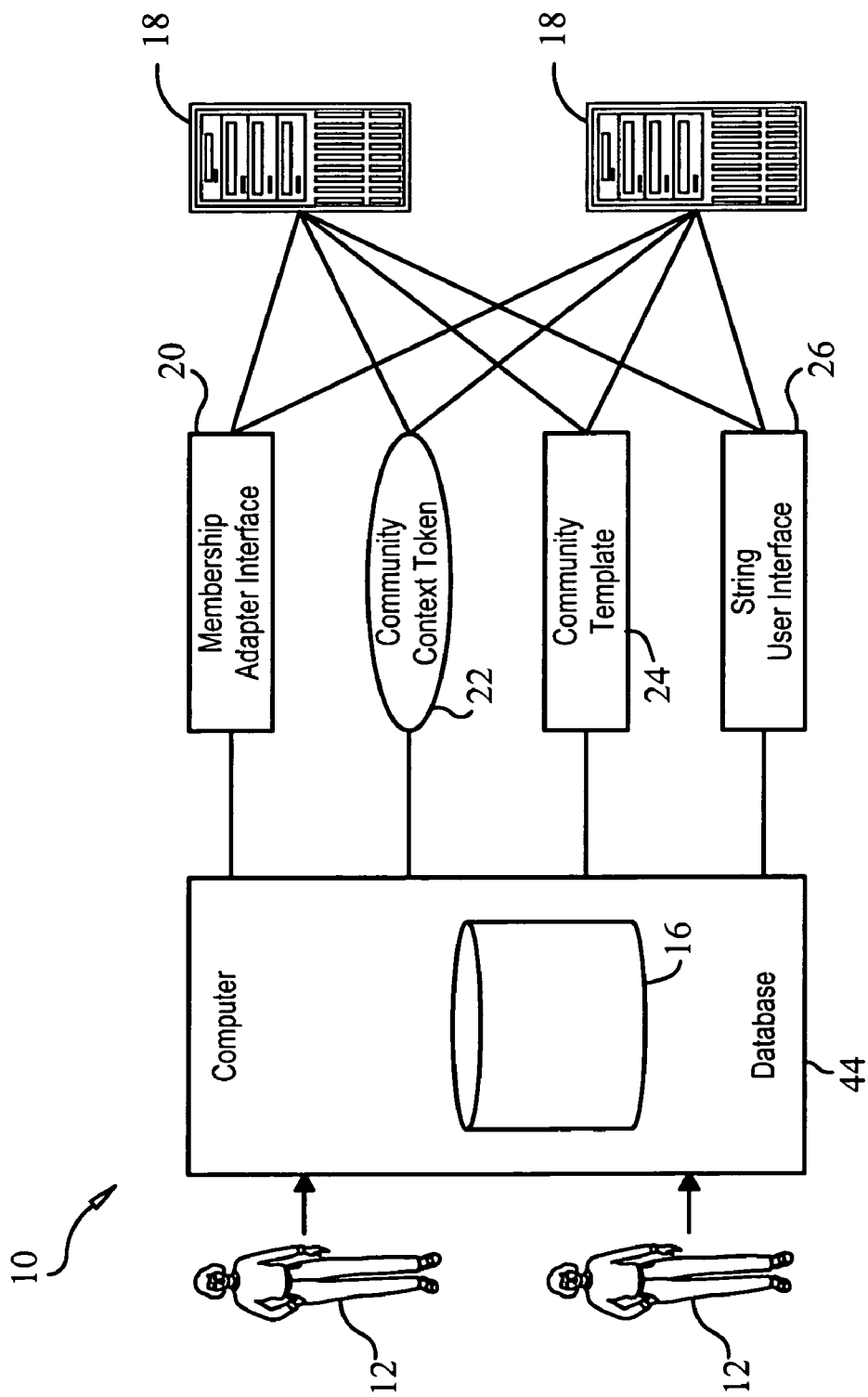
FIG. 1 is an iconic diagram of a system for a community independent of a physical collaborative computing system constructed in accordance with the principles of the present invention.

The present invention is a method and system for the establishment and maintenance of a collaborative computing community that is independent of the existence of a physical collaborative computing system. Referring now to the drawing figures in which like reference designators refer to like elements there is shown in FIG. 1 a system for a collaborative computing community that is independent of a physical collaborative computing system and is designated generally as 10. System 10 includes one or more users 12 having data corresponding to their existence as part of a community stored on computer 14 in database 16. Users 12 form a community by virtue of sharing a common interest, such as employees of a company. Computer 14 can be any hardware platform capable of supporting a database 16, the size and capabilities of computer 14 being arranged to accommodate the functions described herein along with the expected user demand placed thereon.

Also, it should be noted that, although computer 14 can be a collaborative computing system, computer 14 can be supporting any system that works with users. The data stored in database 16 for the users includes data to manage the members of the community such as names, locations, identification numbers and the like. Database 16 also stores mappings between the users 12, their roles within the community and those components which relate to those roles.

Components which relate to those roles which are also included as part of system 10 include one or more collaborative components 18. Collaborative components 18 are those elements which are explicitly or implicitly interacted with by users 12. For example, a collaborative component may be a payroll system, electronic document library, discussion forum, etc. In other words, collaborative component 18 is any system, information repository, and the like which somehow relates to the community members.

By way of example, a user 12 may be a new employee of company X. An administrator may enter certain information about the new employee into database 16 such as the user's name, social security number, department, yearly compensation and office location. Collaborative components 18 may include a discussion forum relating to health care benefits as well as the payroll system. The present invention provides a mechanism by which the information stored in database 16 can be used to facilitate connecting the community formed by users 12 with the payroll system.

There are four tiers which can be plugged into a collaborative component to provide structure to the community user model described herein as well as back end services. These tiers can be provided, for example, the Java 2 Platform, Enterprise Edition (J2EE) model. Under this model, the four tiers of components that can be plugged into an application include the user tier, workspace tier, service tier and resource tier. It is presumed that one of ordinary skill in the art is familiar with J2EE and can implement these tiers, as needed, based on the description provided herein.

The user tier provides widgets and portlets for managing the community, managing the user experience model for the community, provides direct integration for the community as well as an on-line awareness for the community. As used herein the term "portlet" refers to a java based web component, managed by a portlet container, that processes requests and generates dynamic content. For example, web portals use portlets as pluggable user interface components that provide a presentation layer to information systems. Portlets provide a separate window interface to an application within a larger group of interfaces. The workspace tier provides the service level application program interface ("API") used by developers to create and manage the community. The service tier provides the service implementation of the programmatic software code providing the community. The resource tier provides persistent storage for specific instances for the community.

Independence between the community and the collaborative components 18 allows the provision of a system that uses these collaborative component tiers to provide membership adapter interface 20, community context token 22, community template 24 and string user interface ("UI") 26, each of which are included as part of system 10. Each of membership adapter interface 20, community context token 22, community template 24 and string UI 26 are explained in detail.

Membership adapter interface 20 is used by collaborative component 18 to communicate with the community. For ease of discussion, community as used herein refers to the aggregation of data corresponding to users 12 as present in database 16 on computer 14. Membership adapter interface 20 describes the expected functions for managing a community with respect to collaborative component 18. Membership adapter interface 20 can be implemented as programmatic software code on one or more of computer 14 and collaborative component 18 and is used to pass information between database 16 and collaborative component 18.

The interface includes an "addmembers" method, a "removemembers" method, a "getpermissionset" method and an "updatemembers" method. The interface defined by the "addmembers" method is:

AddMembers (CommunityComponentId (ccID), memberstobeaddedarray)

The method provided by this interface calls the collaborative component identified by the object (this is the community context token 22 described below) and passes the "memberstobeaddedarray". This array is an array of member objects that are being added. Each member object also includes an array of permission sets which are assigned to the member being added. Permission sets refer to the access rights and permissions to be granted to the member, e.g. user 12, for whom some form of rights are to be granted on the corresponding collaborative component.

The "removemembers" interface is defined by the method:
RemoveMembers (CommunityComponentId, memberstoberemovedarray)

The method produced by this interface calls the collaborative component corresponding to the collaborative component ID and passes the memberstoberemovedarray. This array is an array of member objects that are being removed. Each member object also includes an array of permission sets the member is being removed from. The "updatemembers" method is used to update permission sets and is structured the same way as the "addmembers" method.

Membership adapter interface 20 also provides a mechanism by which the community defined within database 16 can communicate with a collaborative component 18 to synchronize the community roles with the mappings specified for the collaborative component. The method corresponding to this interface is:
GetPermissionSets (CommunityComponentId)

For example, consider a collaborative component 18 which provides a department-wide memorandum document library. This collaborative component 18 may include the abilities to create memoranda and read memoranda. Community defined within database 16 may include employees and managers. These roles need to be mapped to the specific permissions available within collaborative component 18. In other words, an administrator setting up the mappings between collaborative component 18 and the community defined within database 16 must know the permissions so that mapping can be affected. The GetPermissionSets interface facilitates obtaining the permission mappings. Mappings can be predefined or can be configured dynamically. Put another way, predefined mappings establish exactly what needs to be set when membership adapter interface 20 is called. Dynamic mappings provide for editing existing permission mappings.

Community context token 22 provides a unique identifier for the collaborative component 18 that is connected to the community, thus providing the context for the community. Community context token 22 is provided through membership adapter interface 20 and provides a way for community members to address an instance of collaborative component 18.

Community template 24 provides the abstract description and constituent parts of a community instance. Community template 24 indicates what collaborative components 18 are accessible by a particular community, the location of the API for invoking these collaborative components, the mapping between the community roles and the permission sets for respective collaborative components 18 and the listing of those community roles within the community. Community template 24 is further explained with reference to FIG. 2.

Figure 2:
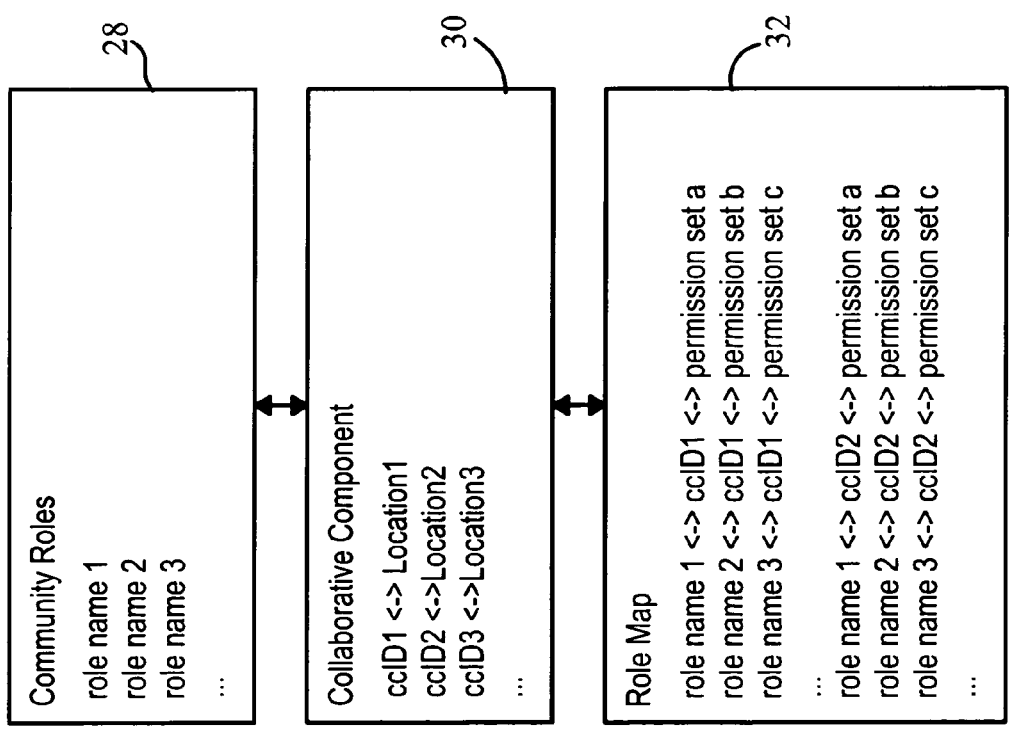
FIG. 2 is a table showing the relationship between community roles, collaborative components and role permissions constructed in accordance with the principles of the present invention.

As shown in FIG. 2, community template 24 includes community role table 28, collaborative component table 30 and role map 32. Community role table 28 lists the names of the roles within the community. As an example, community roles table 28 includes role name 1, role name 2 and role name 3. As still another example, a community template for a classroom might have teacher and student as community roles. Collaborative component table 30 includes collaborative component identifiers and the corresponding location of API for invoking the corresponding collaborative components. Using the classroom community template example, ccID1 can be a number or simply "document library" with the corresponding location doclib.jar. ccID2 might be a discussion forum whose location is df.jar.

Role map 32 provides the mapping between community roles and the named permission sets for a corresponding collaborative component 18. As shown in FIG. 2, role map 32 shows the mapping of role names 1, 2 and 3 to ccID1 and ccID2 along with the corresponding permission set for each mapping. Once again using the classroom community template example, the role names of teacher and student would map to the document library and document forum ccIDs with corresponding permissions. For example, the teacher role might map to a document library which in turn maps to a manger permission set. For the document forum ccID, the teacher role might map to a moderator permission set. For the student, the document library ccID role maps to an author permission set while the document form ccID for the student would map to contributor permission set. The manager, author, moderator and contributor permission sets defines access permissions for the mapped collaborative component.

As shown and described, the community template can be used to construct classroom community instances, with real people in the community roles. Of course, the present invention is not limited solely to classroom template. Templates for various types of communities can be created using the model defined by the present invention. Community template 24 as well as the data for specific instances of community role table 28, collaborative component table 30 and role map 32 can be stored on computer 14 within database 16, separately from database 16 or on a separate computer altogether.

String user interface 26 allows system 10 to present a custom user interface for community and roles. This arrangement advantageously allows system 10 to be used in different locales, such as different geographic regions, that employ different languages. For example, a community in Germany may need a user interface in the German language for roles corresponding thereto while a U.S. community would need the same user interface but in the English language.

Figure 3:
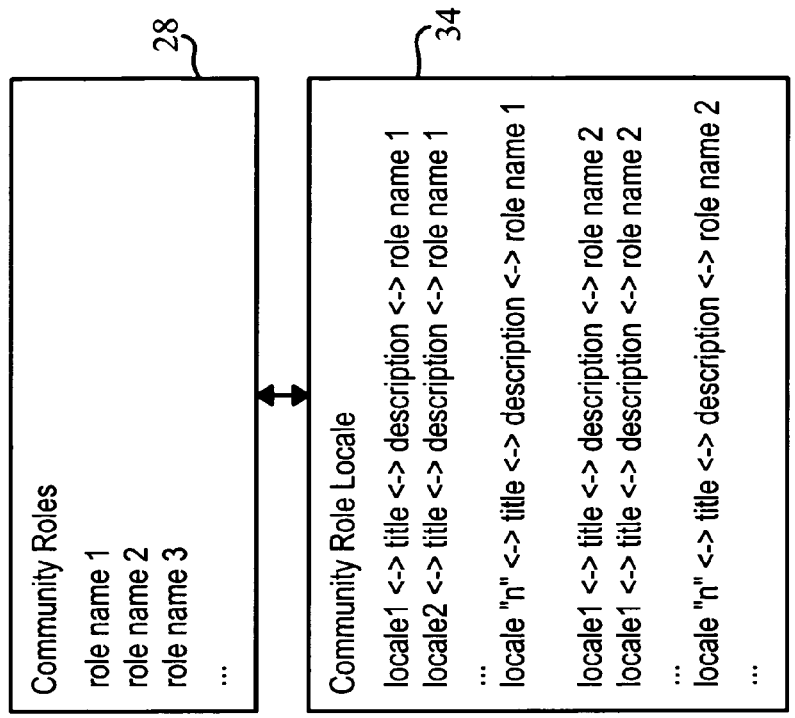
FIG. 3 is table showing the relationship between community roles and user interface strings for different locales permissions constructed in accordance with the principles of the present invention.

Implementation of string UI 26 is described with reference to FIG. 3. Initially, it is presumed that one of ordinary skill in the art can write the programmatic code needed to affect presentation of the actual user interface based on the descriptions herein. As shown in FIG. 3, the data defining string UI 26 is stored in community role table 28 and community role locale table 34. Community role locale table 34 defines, for each role, each locale (or language supported), the name of the role language as well as a description of this role in that language. Community role locale table 34 includes locale identifiers, the title in the language of the corresponding locale for the role name as well as a description of the role in the locale's language.

For example, locale1 in the classroom example can be French whose role name 1 is teacher with the title being "professeur" with an accompanying description in French of what the teacher does. The arrangement advantageously provides a mechanism by which the present invention can be implemented in different communities around the world without the need to rewrite the underlying code in each supported language.

By providing a method and system by which a community of users can be independently bound to collaborative components, the present invention advantageously allows the concept of a community to be extended beyond implementation of a predefined collaborative computing system. As such, the present invention allows systems to be created which support the provisioning of collaborative components. Further, systems can be created which allow disparate collaborative components 18 be provisioned. The ability to interact with disparate collaborative components 18 using membership adapter interfaces 20, community context tokens 22, community templates 24 and string user interfaces 26 allows these disparate systems to be provisioned. For example, the present invention allows for the predefinition of data corresponding to users 12 to be stored in database 16 and provides a means for dynamic acquisition of data if it is not predefined. By which data can be stored or input via prompt.

For example, an administrator who is adding data for a new employee into database 16 can enter certain predefined information about the employee such as name, social security number, start date, compensation, etc. and be prompted for other information depending on the collaborative component 18 to be provisioned. System 10 can be used to provision different collaborative components 18, such as compensation entries in the payroll system, the configuration of the new employee on various discussion forums and document libraries (with options corresponding to the employee's role) within each collaborative component.

Further, this arrangement is extendable to behavioral tasks. For example, the addition of a new employee into the community may, in addition to the above-described provisioning activities, generate an e-mail message or other notification to an assistant to order desk supplies, business cards, etc. The present invention therefore provides a method and system which can streamline provisioning and the execution of behavioral tasks within the community, even in the absence of a collaborative computing system.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system having a central processing unit and a computer program stored on a storage medium that, when loaded and executed, controls the computer system such that it carries out the methods and functions described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the forgoing specification, as indicating the scope of the invention.

We claim:

1. A method for the establishment and maintenance of a collaborative computing community including one or more collaborative components and one or more community members having membership data corresponding to their membership stored in a database, the method comprising:

using a membership adapter interface to facilitate an exchange of information between the database and the collaborative components; and storing a community template, the community template indicating which collaborative components are accessible by the one or more community members;

storing data defining a string user interface, the string user interface being used to provide a user interface in a predetermined language;

wherein the community template provides an abstract description and constituent parts of a community instance for use in constructing community instances and includes:

a community role table of roles within the community;

a collaborative component table identifying one or more collaborative components and API locations corresponding to the one or more collaborative components; and a role map defining a mapping between the community roles in the community role table, named permission sets and the one or more identified collaborative components.

2. The method of claim 1, wherein using the membership adapter interface includes using one or more objects to add members, remove members and update member information in a respective one or more of the collaborative components.

3. The method of claim 2, wherein using the membership adapter interface further includes using an object to synchronize community roles with the mappings specified for a corresponding one of the collaborative components.

4. The method of claim 3, wherein the specified mappings include one or more of predefined mappings and dynamically configured mappings.

5. The method of claim 1, wherein the data defining the string user interface includes:

a community role table of roles within the community; and a community role locale table defining for each of the roles within the community: a name of each role in a language for the corresponding locale; and a description of each role in the language for the corresponding locale.

6. The method of claim 1, further including provisioning the one or more collaborative components to support the one or more community members based on the store template.

7. A computer-readable storage medium storing a computer program which when executed performs a method for the establishment and maintenance of a collaborative computing community including one or more collaborative components and one or more community members having membership data corresponding to their membership stored in a database, the method comprising:

using a membership adapter interface to facilitate an exchange of information between the database and the collaborative components; and storing a community template, the community template indicating which collaborative components are accessible by the one or more community members;

storing data defining a string user interface, the string user interface being used to provide a user interface in a predetermined language;

wherein the community template provides an abstract description and constituent parts of a community instance for use in constructing community instances and includes:

a community role table of roles within the community;

a collaborative component table identifying one or more collaborative components and API locations corresponding to the one or more collaborative components; and a role map defining a mapping between the community roles in the community role table, named permission sets and the one or more identified collaborative components.

8. The computer-readable storage medium of claim 7, wherein using the membership adapter interface includes using one or more objects to add members, remove members and update member information in a respective one or more of the collaborative components.

9. The computer-readable storage medium of claim 8, wherein using the membership adapter interface further includes using an object to synchronize community roles with the mappings specified for a corresponding one of the collaborative components.

10. The computer-readable storage medium of claim 9, wherein the specified mappings include one or more of predefined mappings and dynamically configured mappings.

11. The computer-readable storage medium of claim 7, wherein the data defining the string user interface includes:
 a community role table of roles within the community; and
 a community role locale table defining for each of the roles within the community: a name of each role in a language for the corresponding locale; and a description of each role in the language for the corresponding locale.

12. The computer-readable storage medium of claim 7, wherein the method performed by the stored computer program when executed further includes provisioning the one or more collaborative components to support the one or more community members based on the store template.

13. A system for a collaborative computing community having one or more community members, the system comprising:
 at least one collaborative component; and
 a computer having:
  a database storing:
   membership data for the one or more community members;
   data defining a string user interface, the string user interface being used to provide a user interface in a predetermined language; and
   a community template, the community template indicating which collaborative components are accessible by the one or more community members; and
  a central processing unit, the central processing unit using a membership adapter interface to exchange information between the database and the collaborative components based on the community template;
 wherein the community template provides an abstract description and constituent parts of a community instance for use in constructing community instances and includes:
  a community role table of roles within the community;
  a collaborative component table identifying one or more collaborative components and API locations corresponding to the one or more collaborative components; and
  a role map defining a mapping between the community roles in the community role table, named permission sets and the one or more identified collaborative components.

14. The system of claim 13, wherein using the membership adapter interface includes using one or more objects to add members, remove members and update member information in a respective one or more of the collaborative components.

15. The system of claim 14, wherein using the membership adapter interface further includes using an object to synchronize community roles with the mappings specified for a corresponding one of the collaborative components.

16. The system of claim 15, wherein the specified mappings include one or more of predefined mappings and dynamically configured mappings.

17. The system of claim 13, wherein the data defining the string user interface includes:
 a community role table of roles within the community; and
 a community role locale table defining for each of the roles within the community: a name of each role in a language for the corresponding locale; and a description of each role in the language for the corresponding locale.

18. The system of claim 13, wherein the central processing unit is operable to control at least a part of the provisioning process to provision the one or more collaborative components to support the one or more community members based on the store template.

* * * * *